(12) United States Patent
Akatsu (10) Patent No.: US 7,519,176 B2
(45) Date of Patent: Apr. 14, 2009

(54) KEY TELEPHONE SET HAVING INTERCHANGEABLE UNITS

(75) Inventor: Masafuku Akatsu, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 595 days.

(21) Appl. No.: 10/764,543

(22) Filed: Jan. 27, 2004

(65) Prior Publication Data
US 2004/0247113 A1 Dec. 9, 2004

(30) Foreign Application Priority Data
Jan. 28, 2003 (JP) ................................ 2003-19016

(51) Int. Cl.
H04M 1/00 (2006.01)
H04M 9/00 (2006.01)
(52) U.S. Cl. .............................. 379/428.04; 379/428.01
(58) Field of Classification Search ................................
379/428.01–428.04, 454, 455, 434, 419, 379/440, 156
See application file for complete search history.

(56) References Cited

U.S. PATENT DOCUMENTS

| | | | | |
|---|---|---|---|---|
| 4,375,584 A | * | 3/1983 | Muzumdar et al. | 379/428.04 |
| 4,773,090 A | * | 9/1988 | Goatman | 379/429 |
| 4,868,875 A | * | 9/1989 | Goatman | 379/429 |
| 6,038,311 A | * | 3/2000 | Nitobe et al. | 379/428.03 |
| 6,405,056 B1 | * | 6/2002 | Altschul et al. | 455/558 |
| 6,970,556 B2 | * | 11/2005 | Wall et al. | 379/355.09 |
| 7,054,423 B2 | * | 5/2006 | Nebiker et al. | 379/201.01 |

FOREIGN PATENT DOCUMENTS

| | | |
|---|---|---|
| JP | 53-110305 | 9/1978 |
| JP | 56-160 U | 1/1981 |
| JP | 3-452 U | 1/1991 |
| JP | 5-6960 U | 1/1993 |
| JP | 5-6961 U | 1/1993 |
| JP | H05-6961 U | 1/1993 |
| JP | 3004142 U | 8/1994 |
| JP | 8-315867 A | 11/1996 |
| JP | 2001-75114 A | 3/2002 |
| JP | 2002-75114 A | 3/2002 |

* cited by examiner

*Primary Examiner*—Curtis Kuntz
*Assistant Examiner*—Phylesha Dabney
(74) *Attorney, Agent, or Firm*—Sughrue Mion, PLLC (57) ABSTRACT

A key telephone set comprises a telephone main body, an interchangeable dial button unit, an interchangeable line button unit, and an interchangeable display unit. The interchangeable dial button unit, the interchangeable line button unit and the interchangeable display unit are attached to the telephone main body while they can be detached from the telephone body from a top surface side of the key telephone set without disassembly of the telephone main body.

14 Claims, 7 Drawing Sheets

KEY TELEPHONE SET HAVING INTERCHANGEABLE UNITS

This application claims priority to prior application JP 2003-19016, the disclosure of which is incorporated herein by reference.

BACKGROUND OF THE INVENTION

This invention relates to a key telephone set and a key telephone system including the key telephone set, in particular, to a key telephone set having interchangeable function units which can be attached/detached to/from a telephone main body without disassembly of the telephone main body.

The key telephone system generally comprises a main device (or a key service unit) and a plurality of key telephone sets connected to the main device.

To meet various demands from users, it is necessary to provide some or many types of telephone sets. For instance, a user needs a display portion while another user needs no display portion. Furthermore, a user needs a small number of line selection buttons for extensions and outside lines while another user needs a large number of the line selection buttons.

An existing key telephone set comprises a telephone main body, a display assembly and a selection button assembly. The display assembly and the selection button assembly are attached to the telephone main body. The display assembly and the selection button assembly can be detached from the telephone main body when the telephone main body is disassembled. Providing interchangeable display assemblies and interchangeable selection button assemblies correspond to providing various types of telephone sets. That is, functions of the key telephone set can be easily changed by the use of different display and different selection button assemblies together with the telephone main body. Such a key telephone set is disclosed in Japanese Unexamined Utility Model Publication No. 5-6961.

Another existing key telephone set comprises a telephone main body, dial and function button units and a decorative panel for positioning the button units on the telephone body. The decorative panel can be detached from the telephone main body from the top surface side of the telephone main body. The dial and function button units can be freely separated from the telephone main body when the decorative panel is detached from the telephone main body. This is because the dial and function button units are merely placed on a predetermined position of the telephone main body. Accordingly, specification of the key telephone set is easily changed by changing the button units for different button units. Such a key telephone set is disclosed in Japanese Unexamined Patent Publication No. 2002-75114.

As a related technique, there is a radio communication apparatus, which is not a key telephone set. The radio communication apparatus comprises a main body and a detachable operation button block which is attached to the main body and which can be detached from the main body. Functions of the radio communication apparatus are changed by the changing the operation button block for a different operation button block Such a radio communication apparatus is disclosed in Japanese Registered Utility Model Publication No. 3004142.

However, the existing key telephone set using the display and the selection button assemblies has a fault that the telephone main body must be disassembled to detach the display and the selection button assemblies from the telephone main body. This is because each assembly has hooks and claws for engaging with the telephone main body while the hooks and the claws can not be disengaged from one another from the outside of the telephone main body.

Furthermore, the other existing key telephone set using the button units and the decorative panel has a fault that it is impossible to meet the user's demands about the number of the line selection buttons and/or about having a display unit or not. The related radio communication apparatus has as similar fault because the operation button block is collectively attached/detached to/from the main body.

SUMMARY OF THE INVENTION

It is therefore an object of this invention to provide a key telephone set having an interchangeable functional unit which can be attached/detached to/from a telephone main body without disassembly of the telephone main body.

Another object of this invention to provide a key telephone system including the key telephone set.

Other object of this invention will become clear as the description proceeds.

According to an aspect of this invention, a key telephone set comprises a telephone main body, an interchangeable dial button unit attached to the telephone main body, an interchangeable line button unit attached to the telephone main body; and an interchangeable display unit attached to the telephone main body. The telephone main body, the interchangeable dial button unit, the interchangeable line button unit and the interchangeable display unit are structured so that the interchangeable dial button unit, the interchangeable line button unit and the interchangeable display unit are detachable from the telephone body from a top surface side of the telephone main body without disassembly of the telephone main body.

According to another aspect of this invention, a key telephone system comprises a main device and a telephone set connected to the main device. The key telephone set comprises a telephone main body, an interchangeable dial button unit attached to the telephone main body, an interchangeable line button unit attached to the telephone main body, and an interchangeable display unit attached to the telephone main body. The telephone main body, the interchangeable dial button unit, the interchangeable line button unit and the interchangeable display unit are structured so that the interchangeable dial button unit, the interchangeable line button unit and the interchangeable display unit are detachable from the telephone body from a top surface side of the telephone main body without disassembly of the telephone main body.

DESCRIPTION OF THE PREFERRED EMBODIMENT

Figure 1:
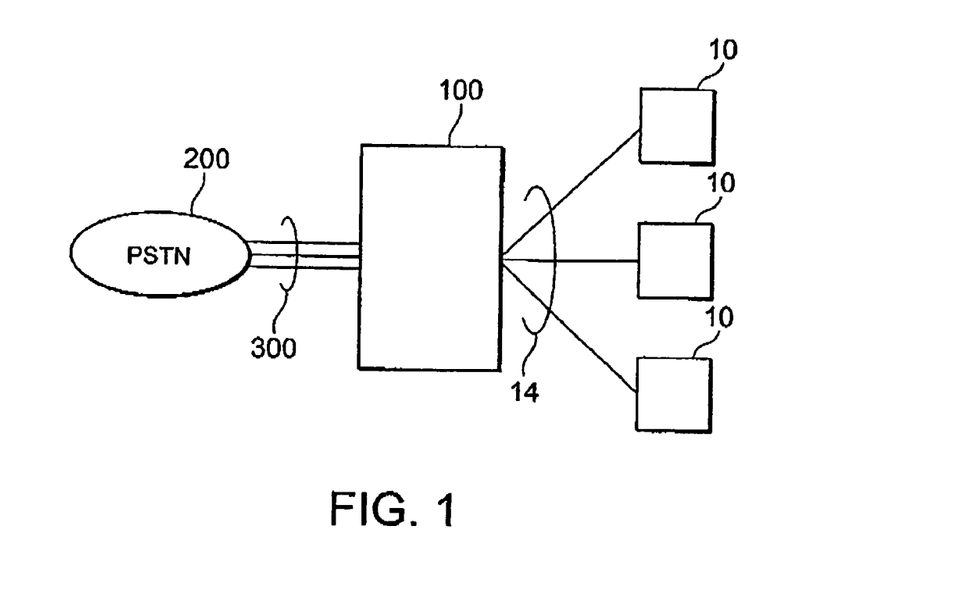
FIG. 1 is a block diagram of a key telephone system including a key telephone set according to a preferred embodiment of this invention.

Referring to FIG. 1, description will be at first directed to a key telephone system to which a key telephone set according to a preferred embodiment of this invention is applicable.

As illustrated in FIG. 1, the key telephone system comprises a main device (or a key service unit) 100 for controlling the whole system. The main device 100 is connected to a public switched telephone network (PSTN) 200 through one or more subscriber's lines 300. The key telephone sets 10 are connected to the main device 100 through extension lines 14. Since the operation of the telephone system is well known, its explanation may be omitted.

Figure 2:
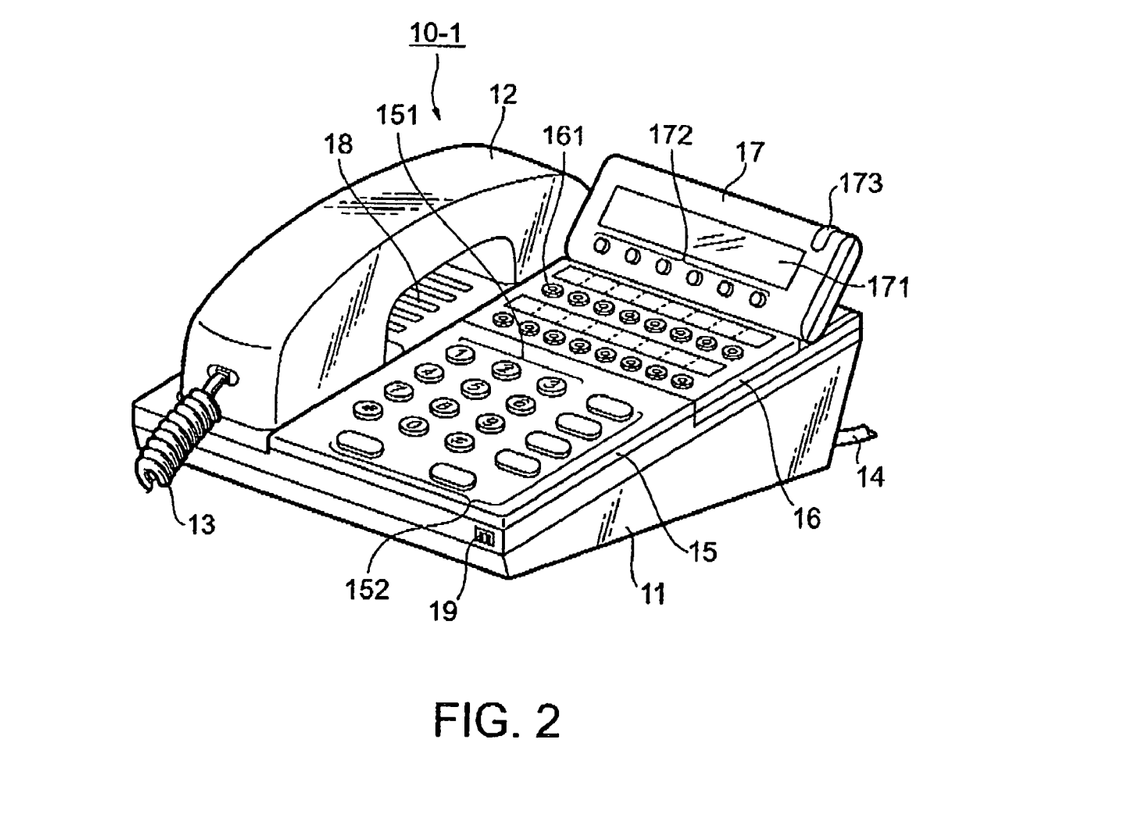
FIG. 2 is an oblique perspective view of a first type of the key telephone set used in the key telephone system of FIG. 1.

FIG. 2 shows a first type of the key telephone set 10. The first type key telephone set 10-1 comprises a telephone main body 11 and a handset 12 connected to the telephone main body 11 with an elastic spiral cable 13. The telephone main body 11 is connected to the extension line 14. An interchangeable dial button unit 15, an interchangeable line button unit 16 and an interchangeable liquid crystal display (LCD) unit 17 are detachably attached to the telephone main body 11.

Additionally, the telephone main body 11 comprises a hook switch unit (see FIG. 6B or 7) for detecting on/off states of the handset 12, a main circuit board unit (not shown) on which various circuits are mounted, a dial button circuit board unit (not shown) for transmitting pushing down information from the dial button unit 15 to the main circuit board unit, a loudspeaker 18, and a microphone for detecting external sound.

Figure 3:
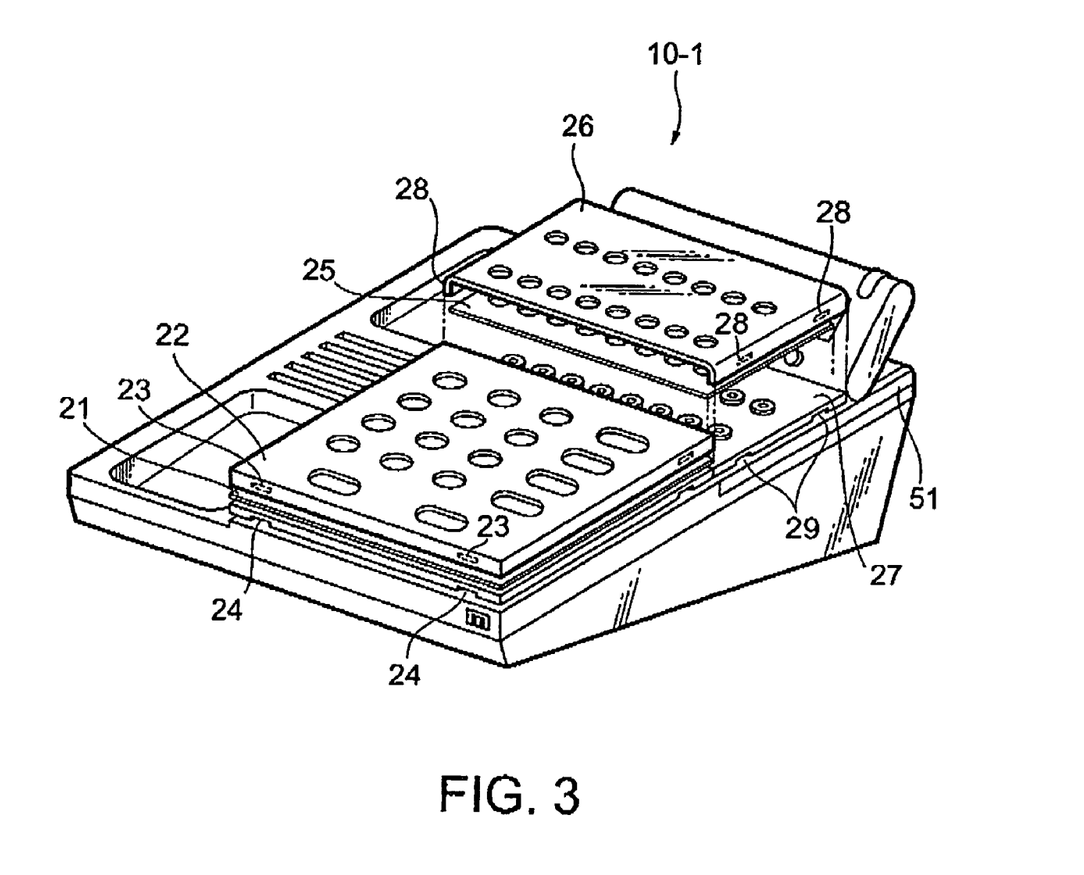
FIG. 3 is an exploded view for describing a dial button unit and a line button unit of the key telephone set of FIG. 2.

The dial button unit 15 comprises a predetermined set of dial buttons 151, a plurality of function buttons 152. As shown in FIG. 3, the dial button unit 15 further comprises an interchangeable dial card 21 and an interchangeable dial panel 22. The dial card 21 has a main surface on which letters, ideographs, marks and so on may be written. The dial curd may be also colored. That is, the dial card 21 is used for providing visual design and/or visual information (line No., name or the like). The dial card 21 is made of, for instance, a paper sheet. The dial panel 22 covers the dial card 21 and keeps the main surface visible. The dial panel 22 comprises, for instance, a transparent molding member.

The dial card 21 is placed on a predetermined position of the telephone main body 11. By attaching the dial panel 22 to the telephone main body 11, the dial card 21 is held and positioned between the dial panel 22 and the telephone main body 11. The attachment of the dial panel 22 to the telephone main body 11 is achieved by the means of protrusions 23 formed on one of the dial panel 22 and the telephone main body 11 and cavities 24 formed on the other. The protrusions 23 and the cavities 24 can be engaged with each other by using flexibility of the dial panel 22. That is, the dial panel 22 is fixed to the telephone main body 11 by engagement between the protrusions 23 and the cavities 24.

Returning to FIG. 2, the line button unit 16 comprises a plurality of line buttons 161 for selecting one from outside lines and extension lines. Each line button 161 is related to one or two liquid crystal diodes (LEDs) incorporated therein to indicate connection states of a corresponding line. Each of the LEDs may be located at a vicinity of the corresponding line button 161 instead of incorporation with the corresponding line button 161. In the case where two LEDs are related to each line button 161, they has different in color from each other.

The line button unit 16 further comprises, as shown in FIG. 3, a line card 25 and a line panel 26. The line card 25 and the line panel 26 are similar to the dial card 23 and the dial card 24. To attach the line panel 26 to an upper cover 27 of the line button unit 16, protrusions 28 are formed on one of them while cavities 29 are formed on the other.

Returning again to FIG. 2, the LCD unit 17 comprises a liquid crystal display panel 171 for displaying various information, such as pushing down states of the buttons, a communication state, a waiting state and so on. Function keys 172 are for selecting functions of the LCD unit 17. A message lamp 173 is for visually notifying calling, receipt of message or the like.

As mentioned above, the dial button unit 15, the line button unit 16 and the LCD unit 17 are detachably attached to the telephone main body 11. Accordingly, the type (or specification) of the key telephone set 10 can be easily changed into other types as shown in FIGS. 4 and 5.

Figure 4:
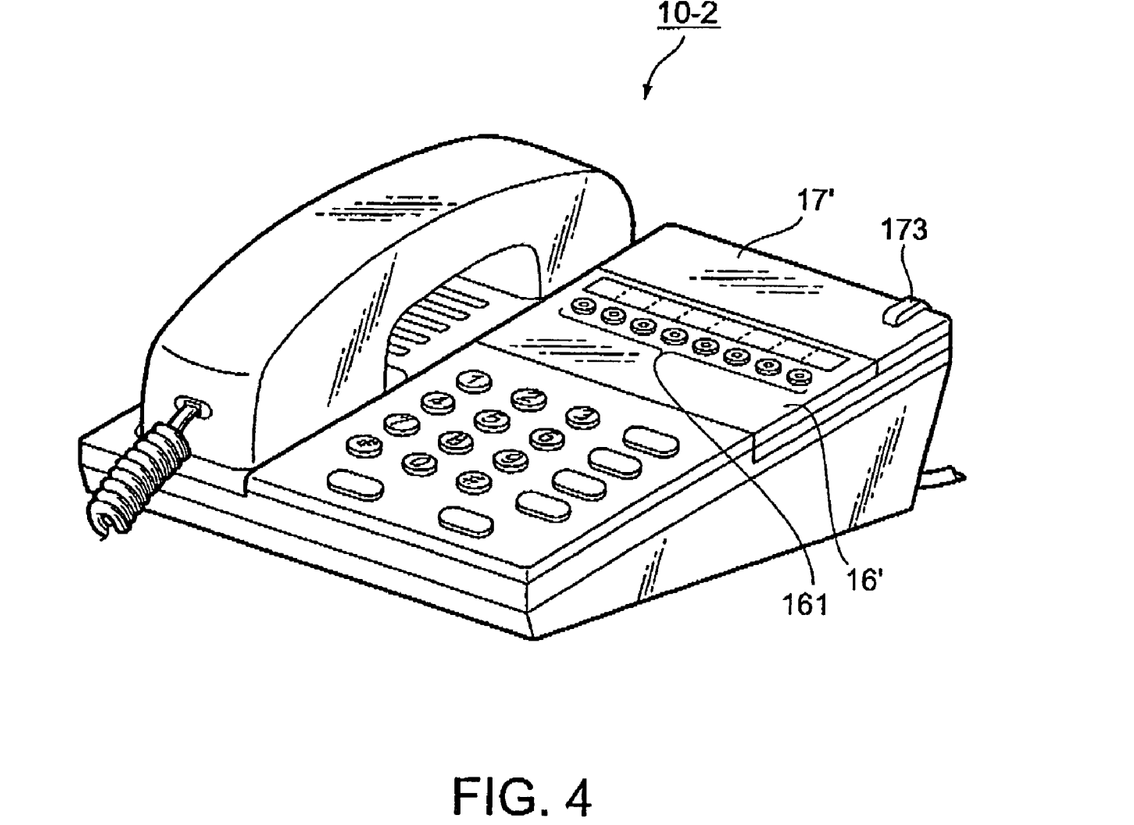
FIG. 4 is an oblique perspective view of a second type of the key telephone set which is different from the first type in that it has a different line button unit and a different display unit.
Figure 5:
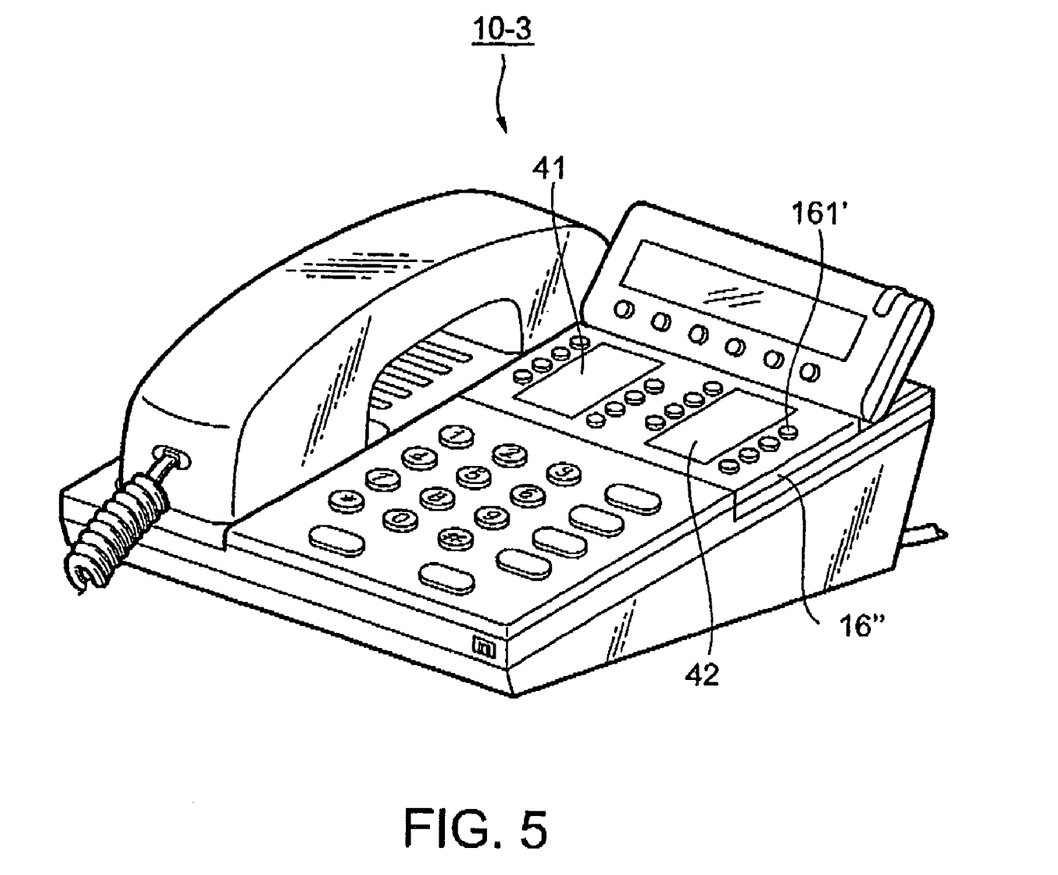
FIG. 5 is an oblique perspective view of a third type of the key telephone set which is different from the first type in that it has a different line button unit with liquid crystal panels.

FIG. 4 shows a second type of the key telephone set 10. The second type key telephone set 10-2 comprises an interchangeable line button unit 16' which has line buttons 161 smaller in number than those of the line button unit 16 of FIG. 2. The line button unit 16' includes an upper cover which is identical to that of the line button unit 16 of FIG. 2. The upper cover has holes for the line buttons 161 larger in number than the line buttons 161. Accordingly, some of the holes are idle. However, the idle holes do not have disadvantages because they are covered by a contact rubber and the line panel from the inside and the outside of the upper cover, respectively.

The key telephone set 10-2 further comprises an interchangeable dummy LCD unit 17' with the message lamp 173. The dummy LCD unit 17' is different from the LCD unit 17 of FIG. 2 in having no LCD panel and no function key.

The key telephone set 10-2 is less expensive than the key telephone set 10-1 of FIG. 2 because it has less functions.

FIG. 5 shows a third type of the key telephone set 10. The third type key telephone set 10-3 comprises an interchangeable line button unit 16" having two LCD panels 41 and 42 and line button 161' related to the LCD panels 41 and 42. The line button unit 16" has no line card and no line panel while the line buttons 161' have no LED. The line buttons 161' may be staggered on both sides of the LCD panels 41 and 42. The LCD panels 41 and 42 serve as not only the LEDs incorporated into the line buttons 161 of FIG. 2 but also the line card 25. That is, the LCD panels 41 and 42 can use for displaying matters which are to be written on the line card 25. Thus, the LCD panels 41 and 42 displays various information concerning the line buttons 161'.

When two colors LEDs (e.g. red and green color LEDs) are used for displaying the line states as the line button unit 16 of FIG. 2, there is a case where a colorblind user can not distinguish the line states from each other. On the other hand, the LCD panels 41 and 42 enable the colorblind user to distinguish the line states by the means of displaying letters, marks or the like. Furthermore, the LCD panels 41 and 42 can shade and/or blink the displayed matters.

Next, the description will be made about attaching/detaching mechanisms between the telephone main body and the line button unit 16" and between the line button unit 16" and the LCD unit 17. The attaching/detaching mechanisms are applied to the line button units 16 and 16' and the LCD unit 17'.

Figure 6A:
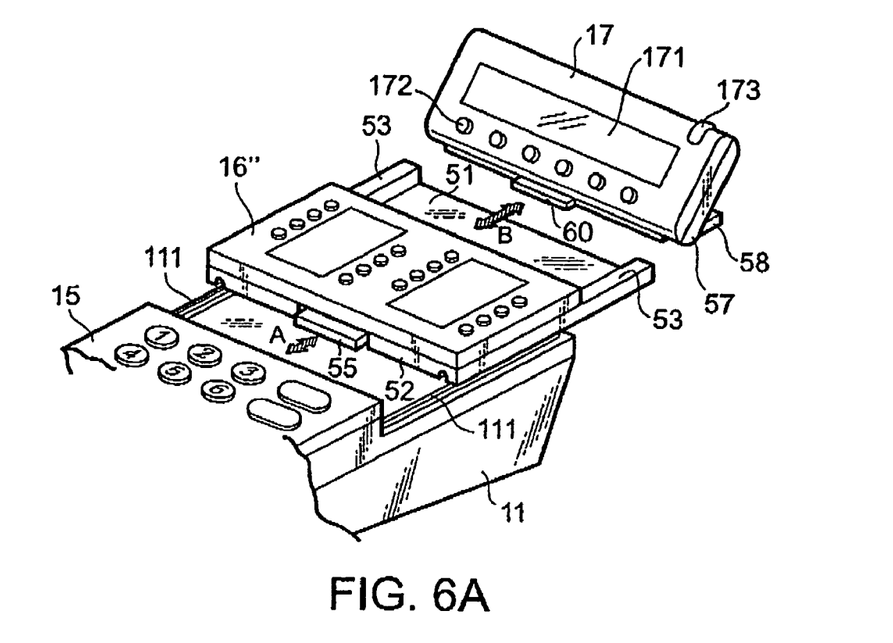
FIG. 6A is a partial exploded view, as seen from a right hand front side, for describing attaching/detaching structures for the line button unit and the display unit of the third type key telephone set.
Figure 6B:
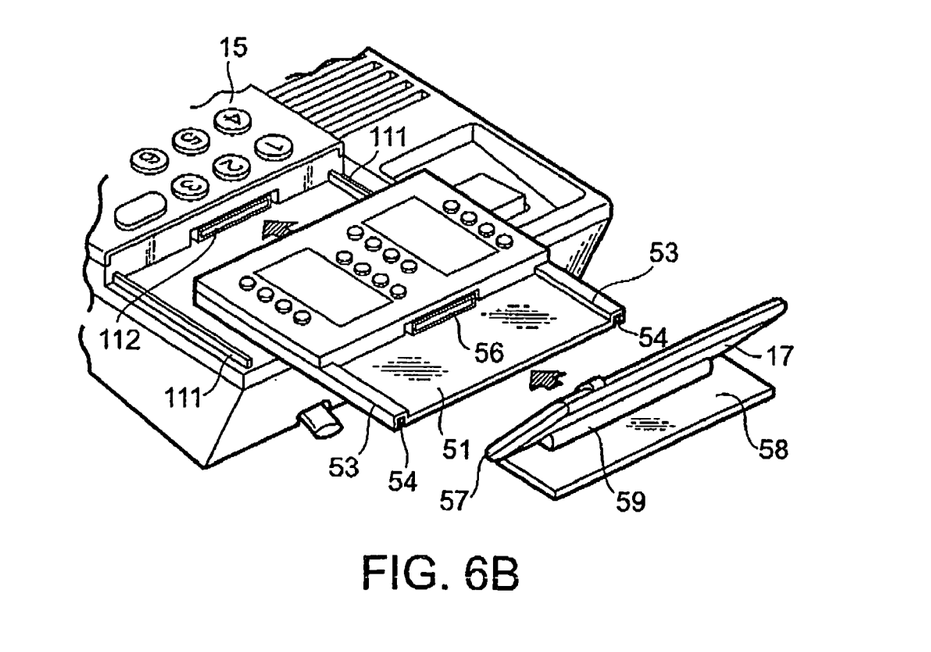
FIG. 6B is a partial exploded view, as seen from a right hand rear side, for describing the attaching/detaching structures for the line button unit and the display unit of the third type key telephone set.

As understood from FIGS. 6A and 6B, the line button unit 16" can be attached/detached to/from the telephone main body 11 by sliding it on the telephone main body 11 along an arrow A (or backward and frontward). The LCD unit 17 can be attached/detached to/from the line button unit 16" by sliding it on a pendent portion 51 of the line button unit 16" along an arrow B (or backward and frontward). The LCD unit 17 can be attached to the telephone main body 11 through the line button unit 16" and detached from the telephone main body 11 by being detached from the line button unit 16". Thus, the line button unit 16" is detachably attached to the telephone main body 11 with a sliding attachment mechanism while the LCD unit 17 is detachably attached to the line button unit 16" with another sliding attachment mechanism.

The line button unit 16" has the same basic structure as those of the line button units 16 and 16'. The line button unit 16" is different from the line button units 16 and 16' in having the LCD panels 41 and 42 and a control circuit for the LCD panels 41 and 42. Furthermore, the line button unit 16" is different from the line button units 16 and 16' in having no LED, no line card and no line panel.

The line button unit 16" comprises, in addition to the LCD panels 41 and 42 and the control circuit for the LCD panels 41 and 42, a line button circuit board unit (not shown) on which a conductive pattern (or a circuit pattern) including contacts corresponding to the line buttons 161' is formed and which predetermined electric and/or electronic elements are mounted. A contact rubber (not shown) is for turning on the contacts in response to depression of the line buttons 161' and for restoring the line buttons 161' to original positions. An upper cover (corresponding to 27 of FIG. 2) and a lower cover 52 are for housing the line button circuit board unit and the contact rubber. The lower cover 52 is longer than the upper cover in the directions of the front and the rear. Accordingly, the lower cover 52 forms the pendent portion 51 at the rear side when it is combined with the upper cover so that their front ends are aligned. The pendent portion 51 has guide rails 53 at both ends thereof to guide the LCD unit 17. The lower cover 52 has a lower surface in which grooves 54 are formed at the vicinities of both ends (or under the guide rails 53). The grooves 54 correspond to elongated protrusions 111 formed on the telephone main body 11.

The line button unit 16" further comprises a connector 55 at the front end thereof to engage with another connector 122 provided to the telephone main body 11. The connector 55 mechanically electrically connects the line button unit 16" to the telephone main body 11. Furthermore, the line button unit 16" comprises another connector 56 at the rear end of the upper cover. The connector 56 mechanically electrically connects the LCD unit 17 to the line button unit 16". Additionally, the dummy LCD unit 17 can be connected to the connector 56 like the LCD unit 17.

To attach the line button unit 16" to the telephone main body, the line button unit 16" is put on a predetermined position so that the elongated protrusions 111 are received by the grooves 54. Then, the line button unit 16" is slid frontward (or toward the dial button unit 15) and thereby the connector 55 is engaged with a connector 112 exposed from the telephone main body 11 under the dial button unit 15. Thus, the line button unit 16" is electrically connected and mechanically fixed to the telephone main body 11.

The line button unit 16" attached to the telephone main body 11 can easily detached from the telephone main body 11 by sliding it backward. When the line button unit 16" is slid backward, the connector 55 is disengaged from the connector 112. In this event, the elongated protrusions 111 and grooves 54 prevent the connector 55 from receiving force directed rightward, leftward and/or downward. Thus, the connectors 55 and 112 are protected from mechanically damage.

The LCD unit 17 comprises a unit cover 57 to house the LCD panel 171, the function keys 172, the message lamp 173 and a control unit (not shown) for controlling the LCD panel 171, the function keys 172 and the message lamp 173. An LCD unit mount 58 is for attaching the LCD unit 17 to the line button unit 16. A tilt mechanism 59 couples the unit cover 57 with the LCD unit mount 58 to change an angle of inclination of the unit cover 57 regarding the LCD unit mount 58. An LCD unit connector 60 is provided to the LCD unit mount 58 to electrically connected to the control unit housed in the unit cover 57.

The LCD unit mount 58 has a width slightly smaller than a distance between the guide rails 53 of the line button unit 16". The LCD unit mount 58 is put on the pendent portion 51 between the guide rails 53. Then the LCD unit mount 58 is slid frontward to engage the LCD unit connector 60 with the connector 56. Thus, the LCD unit 17 is attached to the line button unit 16".

The LCD unit 17 attached to the line button unit 16" can easily detached from the line button unit 16" by sliding it backward. When the LCD unit 17 is slid backward, the LCD unit connector 60 is disengaged from the connector 56. In this event, the guide rails 53 prevents the connector 60 from receiving force directed rightward, leftward and/or downward.

Next, the description will be made about the dial button unit 15 with referring to FIGS. 7 and 8.

Figure 7:
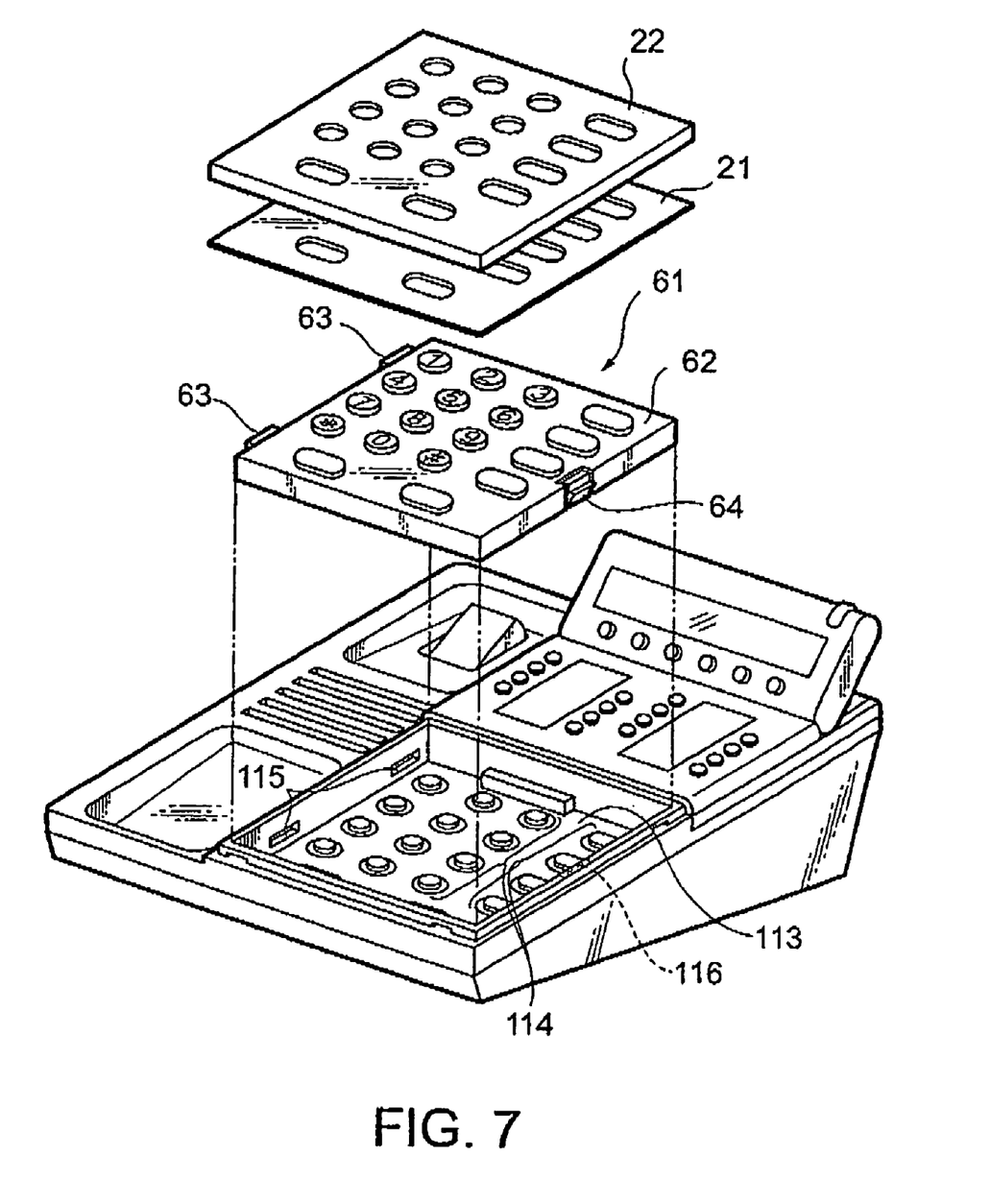
FIG. 7 is a exploded view for describing an attaching/detaching structure for the dial button unit of the third type key telephone set.

As illustrated in FIG. 7, the dial button unit 15 comprises an interchangeable button assembly 61 except both of the dial card 21 and the dial panel 22.

Figure 8:
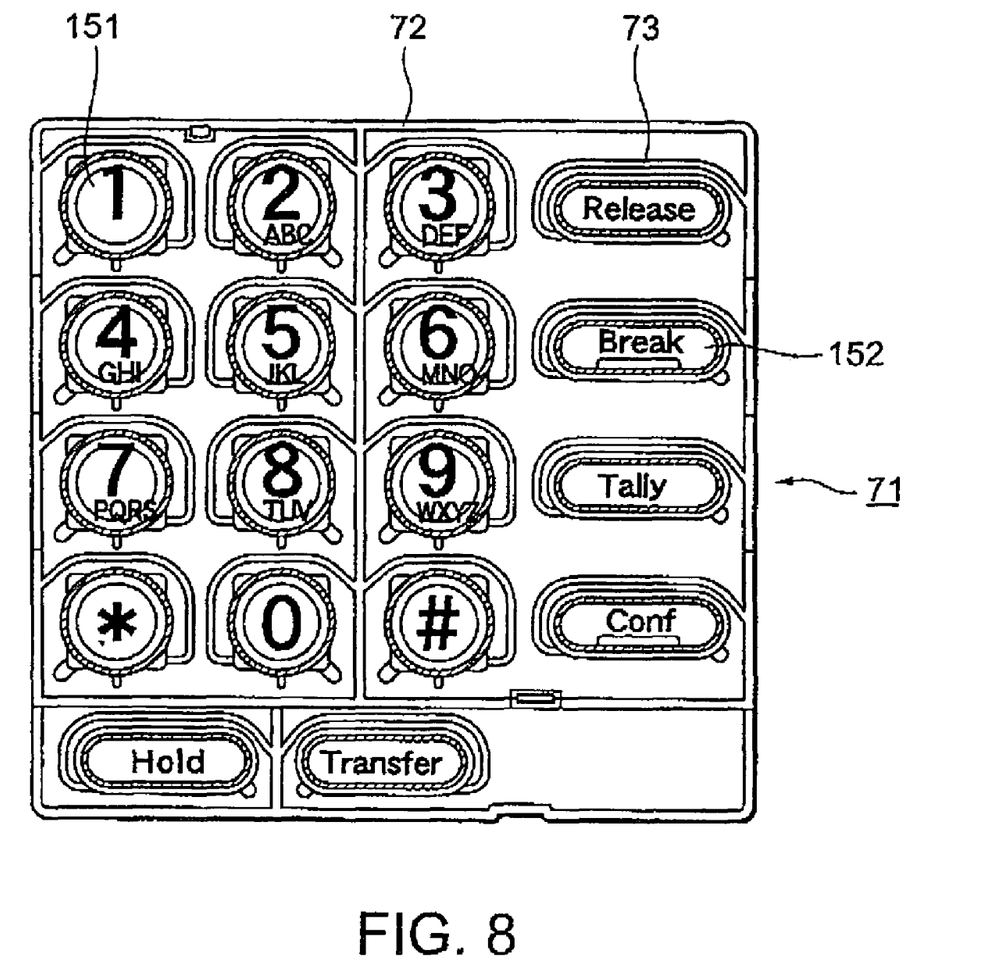
FIG. 8 is a plane view of an example of the button unit used in the third type key telephone set.

The dial button assembly 61 comprises a button unit 71 shown in FIG. 8 and a button cover 62 for covering the button unit 71.

As illustrated in FIG. 8, the button unit 71 comprises a predetermined dial buttons 151, a plurality of function buttons 152, a frame 72, hinges 73 couples both of the dial buttons 151 and the function buttons 152 with the frame 72. The dial buttons 151, the function buttons 152, the frame 72 and the hinges 73 are formed by integral molding using resin. Each of the hinges 73 is thinner than the frame 72 and elastically deformed by pressing a corresponding one of the dial buttons 151 or the function buttons 152 on condition that the frame 72 is fixed.

As the button unit 71, various types may be provided to correspond to various languages, letter sizes and/or letter colors.

Returning to FIG. 7, the button cover 62 defines holes corresponding to the dial buttons 151 and the function buttons 152 at an upper surface thereof. Furthermore, the button cover 62 comprises button guides (not shown) formed on a lower surface thereof to support side surfaces of the buttons 151 and 152. Each of the button guides may have a pipe shape to enclose an outside periphery of the corresponding button. In addition, the button cover 62 provides a pair of positioning claws 63 at one side surface and an engaging portion 64 at the other side surface. The button cover 62 houses the button unit 71 from the lower side thereof while the buttons 151 and 152 are projected from the upper side of the button cover 62.

The telephone main body 11 defines a concave portion 113 for receiving dial button unit 15 (specifically, the button assembly 61). The telephone main body 11 further defines cavities 115 and 116 in the both side surfaces for the concave portion 113. The cavities 115 and 116 are for engaging with the positioning claws 63 and the engaging portion 64.

The telephone main body 11 further comprises a contact rubber having projecting portions 114 which projects into the concave portion 113 and corresponds to the buttons 151 and 152. The contact rubber is located on the dial button circuit board unit in the telephone main body 11. The dial button circuit board unit has contact patterns facing or corresponding to contacts formed on the under surfaces of the projecting portions 114.

To attach the button assembly 61 to the telephone main body 11, the button assembly 61 is inclined to the telephone main body 11. Then, the positioning claws 63 are inserted to the cavities 115 and the button assembly 61 is pushed into the concave portion 113. In this event, the engaging portion 64 engages with the cavity 116 by being elastically deformed. Thereafter, the dial card 21 is put on the button assembly 61 and the dial panel is attached to the telephone main body 11.

To detach the button assembly 61 from the telephone main body 11, the dial panel 22 and the dial card 21 are detached from the telephone main body 11. The button assembly 61 can be detached from the telephone main body 11 by elastically deforming and pulling the engaging portion 64. The dial panel 22 and the button assembly 61 can be detached from the telephone main body 11 by hand. That is, no tool is necessary to detach the button assembly 61 from the telephone main body 11.

Thus, the dial button unit 15 can be easily exchanged for another dial button unit from the top surface of the key telephone set 10 (or the telephone main body 11) without disassembly of the telephone main body 11. Similarly, only the button unit 71 can be easily exchanged for another dial button unit from the top surface of the key telephone set 10 without disassembly of the telephone main body 11.

According to this embodiment, the LCD unit, line button unit and/or the dial button unit can be easily attached/detached to/from the telephone main body without disassembly of the telephone main body. Therefore, it is easy to add/delete/change functions to/from/of the key telephone set.

In addition, there is no fear of mechanical damage and/or electrostatic discharge damage in the telephone main body because the disassembly of the telephone main body is unnecessary.

While this invention has thus far been described in conjunction with the preferred embodiments thereof, it will readily be possible for those skilled in the art to put this invention into practice in various other manners. For example, the attaching mechanisms may adopt other means different from the sliding attachment mechanism. In detail, the elongated protrusions 111 and grooves 54 may be substituted for other means to guide and position the line button unit 16 (16', 16"). Snap fixing using flexibility of molding members, concavity and convexity fixing, or screw fixing may be used as the means for positioning or fixing of the line button unit 16 (16', 16"). At any rate, it is necessary to permit the line button unit 16 (16', 16") to be detached from the button main body 11 from the top surface side of the key telephone set 10 without disassembly of the button main body 11. These are hold true about the guide rail 53.

Furthermore, the dial panel 22 may be attached to the button assembly 61 though it is attached to the telephone main body 11 in the above mentioned embodiment.

What is claimed is:

1. A key telephone set comprising:
   a telephone main body comprising a handset placing unit;
   an interchangeable dial button unit attached to said telephone main body;
   an interchangeable line button unit attached to said telephone main body; and
   an interchangeable display unit attached to said telephone main body,
   wherein said telephone main body, said interchangeable dial button unit, said interchangeable line button unit and said interchangeable display unit are structured so that said interchangeable dial button unit, said interchangeable line button unit and said interchangeable display unit are detachable from said telephone main body without disassembly of said telephone main body,
   wherein said interchangeable line button unit is attached to said telephone main body with a first sliding attachment mechanism,
   wherein said interchangeable display unit is attached to said interchangeable line button unit with a second sliding attachment mechanism and thereby said interchangeable display unit is attached to said telephone main body through said interchangeable line button unit.

2. A key telephone set as claimed in claim 1, wherein said interchangeable display unit comprises a liquid crystal display panel.

3. A key telephone set as claimed in claim 1, wherein said interchangeable display unit comprises a dummy.

4. A key telephone set as claimed in claim 1, wherein said interchangeable line button unit comprises a plurality of line selection buttons and a plurality of light emitting diodes corresponding to said line selection buttons.

5. A key telephone set as claimed in claim 4, wherein said telephone main body is capable of being attached with another interchangeable line button unit different in number of said line selection buttons from said interchangeable line button unit.

6. A key telephone set as claimed in claim 1, wherein said interchangeable line button unit comprises a plurality of line selection buttons and a liquid crystal display panel.

7. A key telephone set as claimed in claim 6, wherein said telephone main body is capable of being attached with another interchangeable line button unit different in number of said line selection buttons from said interchangeable line button.

8. A key telephone set as claimed in claim 1, wherein said telephone main body is capable of being attached with another interchangeable dial unit different in specification from said interchangeable dial unit.

9. A key telephone set as claimed in claim 1, wherein said first sliding attachment mechanism has a sliding direction parallel to that of said second sliding attaching mechanism.

10. A key telephone set as claimed in claim 1, wherein said interchangeable dial button unit, said interchangeable line button unit and said interchangeable display unit are independent of each other.

11. A key telephone set as claimed in claim 1, wherein said interchangeable dial button unit, said interchangeable line button unit and said interchangeable display unit are detachable from said telephone main body from a top surface side of said telephone main body.

12. The key telephone set as set forth in claim 1, wherein said interchangeable line button unit is detachable from said telephone main body without detaching said interchangeable dial button unit.

13. A key telephone system comprising:

a main device; and a telephone set connected to said main device; wherein said key telephone set comprises a telephone main body comprising a handset placing unit, an interchangeable dial button unit attached to said telephone main body, an interchangeable line button unit attached to said telephone main body, and an interchangeable display unit attached to said telephone main body; and wherein said telephone main body, said interchangeable dial button unit, said interchangeable line button unit and said interchangeable display unit are structured so that said interchangeable dial button unit, said interchangeable line button unit and said interchangeable display unit are detachable from said telephone body from a top surface side of said telephone main body without disassembly of said telephone main body, wherein said interchangeable line button unit is attached to said telephone main body with a first sliding attachment mechanism, wherein said interchangeable display unit is attached to said interchangeable line button unit with a second sliding attachment mechanism and thereby said interchangeable display unit is attached to said telephone main body through said interchangeable line button unit.

14. The key telephone system as set forth in claim 11, wherein said interchangeable line button unit is detachable from said telephone main body without detaching said interchangeable dial button unit.

* * * * *